(12) United States Patent
Edwards et al.

(10) Patent No.: US 12,249,228 B2
(45) Date of Patent: Mar. 11, 2025

(54) SYSTEMS AND METHODS FOR INTELLIGENT ALERTING

(71) Applicant: Capital One Services, LLC, McLean, VA (US)

(72) Inventors: Joshua Edwards, Philadelphia, PA (US); Michael Mossoba, Great Falls, VA (US); Tyler Maiman, Melville, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 49 days.

(21) Appl. No.: 17/744,384

(22) Filed: May 13, 2022

(65) Prior Publication Data

US 2023/0368633 A1   Nov. 16, 2023

(51) Int. Cl.
*G08B 21/18* (2006.01)
*G06N 20/00* (2019.01)
*G08B 6/00* (2006.01)
*G08B 7/06* (2006.01)
*G08G 5/00* (2006.01)

(52) U.S. Cl.
CPC ............. *G08B 21/18* (2013.01); *G06N 20/00* (2019.01); *G08B 6/00* (2013.01); *G08B 7/06* (2013.01); *G08G 5/0017* (2013.01)

(58) Field of Classification Search
CPC .......... G08B 21/24; G08B 21/18; G08B 6/00; G08B 7/06; G06N 20/00; G08G 5/0017
See application file for complete search history.

(56) References Cited

U.S. PATENT DOCUMENTS

| | | | |
|---|---|---|---|
| 2013/0067834 A1* | 3/2013 | Downey | E04H 1/125 52/173.1 |
| 2013/0297551 A1* | 11/2013 | Smith | H04L 51/222 706/48 |
| 2014/0070945 A1* | 3/2014 | Dave | G06Q 10/1095 340/540 |
| 2018/0078732 A1* | 3/2018 | Keshavan | A61B 5/4836 |
| 2018/0082550 A1* | 3/2018 | Read | G04G 21/025 |
| 2019/0223781 A1* | 7/2019 | Arrington | A61B 5/7455 |
| 2019/0223871 A1* | 7/2019 | Moore | A61B 17/115 |
| 2020/0405998 A1* | 12/2020 | Franceschetti | G16H 40/63 |
| 2023/0077800 A1* | 3/2023 | Chastain | G06Q 30/0283 705/5 |

* cited by examiner

*Primary Examiner* — Brian Wilson
(74) *Attorney, Agent, or Firm* — TROUTMAN PEPPER LOCKE LLP; Christopher J. Forstner; John A. Morrissett

(57) ABSTRACT

Disclosed embodiments may include a system for intelligent alerting. The system may receive data and activity status information corresponding to a user. Based on the data and activity status information, the system may determine whether a first user alert is required, and if so, may determine a first type of alert and a first time to present the first type of alert to the user. The system may cause a user device to present the first type of alert to the user at the first time.

18 Claims, 3 Drawing Sheets

SYSTEMS AND METHODS FOR INTELLIGENT ALERTING

The disclosed technology relates to systems and methods for intelligent alerting. Specifically, this disclosed technology relates to providing various types of user alerts based on real-time data monitoring.

BACKGROUND

Traditional systems for providing user alerts and notifications typically involve only certain types of devices, such as phones and watches. As such, there are limitations as to these systems being able to provide intelligent customized alerts and notifications tailored to specific users based on contextual information.

Accordingly, there is a need for improved systems and methods for intelligent alerting for users. Embodiments of the present disclosure are directed to this and other considerations.

SUMMARY

Disclosed embodiments may include a system for intelligent alerting. The system may include one or more processors, and memory in communication with the one or more processors and storing instructions that, when executed by the one or more processors, are configured to cause the system to provide intelligent alerting. The system may receive data (e.g., travel data, flight information, etc.) corresponding to a user. The system may receive, via one or more user devices, activity status information associated with the user, such as location data, biometric data, breathing rate, heart rate, and the like. Based on the data and the activity status information, the system may determine whether a first user alert is required, for example, to wake the user from a nap. Responsive to determining the first user alert is required, the system may determine a first type of alert (e.g., a sound, a light, etc.) and a first time to present the first type of alert to the user, and may cause at least one of the one or more user devices to present the first type of alert to the user at the first time. The system may further receive, via the at least one of the one or more user devices, updated activity status information associated with the user. The system may determine whether the updated activity status information exceeds a predetermined threshold. Responsive to determining the updated activity status information does not exceed the predetermined threshold, the system may determine a second type of alert and a second time to present the second type of alert to the user, and may cause the at least one of the one or more user devices to present the second type of alert to the user at the second time.

Disclosed embodiments may include a system for intelligent alerting. The system may include one or more processors, and memory in communication with the one or more processors and storing instructions that, when executed by the one or more processors, are configured to cause the system to provide intelligent alerting. The system may receive flight data corresponding to a user. The system may receive one or more alert preferences associated with the user. The system may receive, via one or more user devices, activity status information associated with the user. Based on the flight data, the one or more alert preferences, and the activity status information, the system may determine a first type of alert and a first time to present the first type of alert to the user. The system may cause at least one of the one or more user devices to present the first type of alert to the user at the first time.

Disclosed embodiments may include a system for intelligent alerting. The system may include one or more processors, and memory in communication with the one or more processors and storing instructions that, when executed by the one or more processors, are configured to cause the system to provide intelligent alerting. The system may receive data corresponding to a user. The system may receive, via one or more user devices, activity status information associated with the user. Based on the data and the activity status information, the system may determine that a first user alert is required, and responsive to determining the first user alert is required, may determine a first type of alert and a first time to present the first type of alert to the user. The system may further cause at least one of the one or more user devices to present the first type of alert to the user at the first time.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
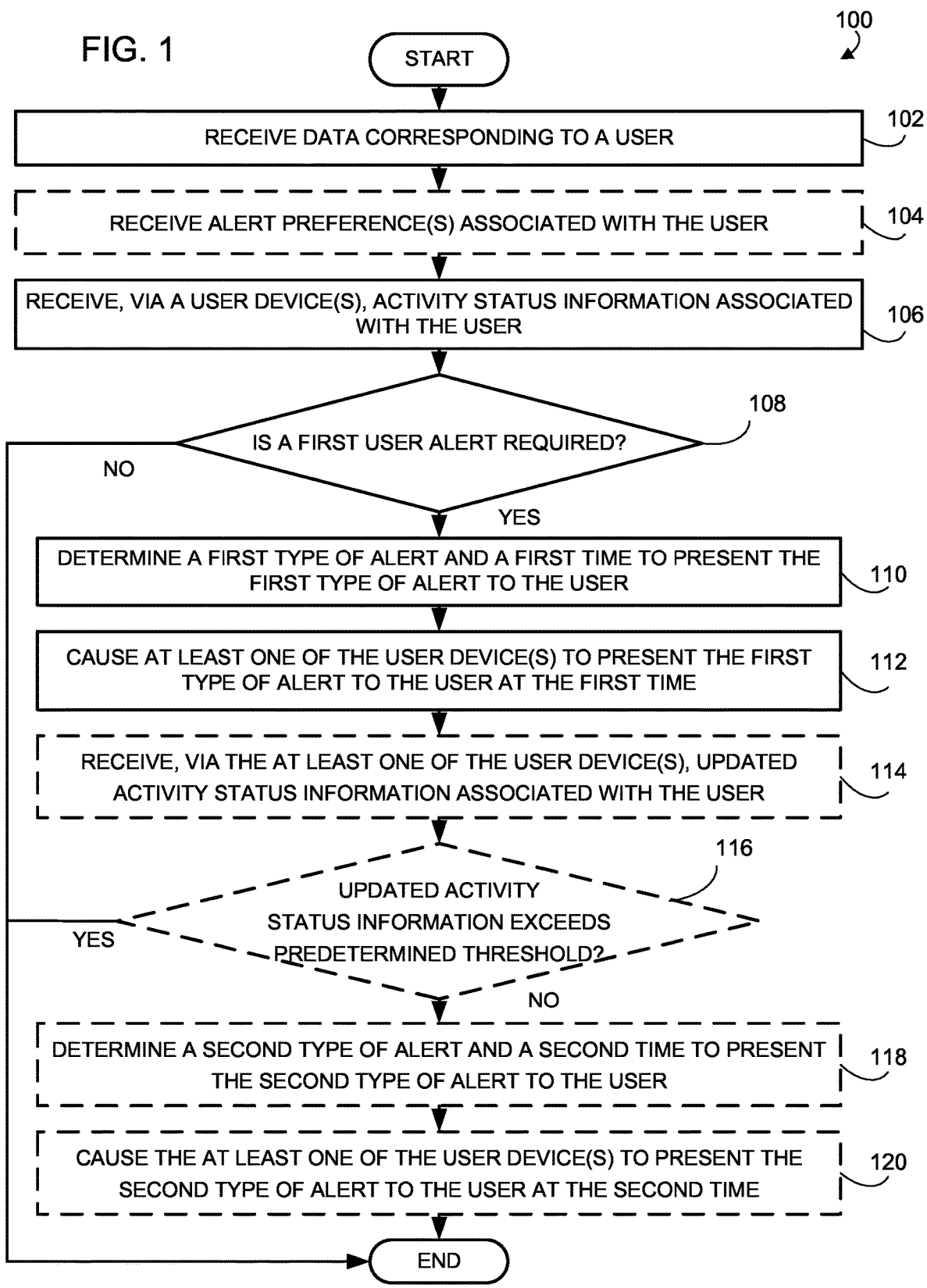
FIG. 1 is a flow diagram illustrating an exemplary method for intelligent alerting in accordance with certain embodiments of the disclosed technology.

Examples of the present disclosure may relate to systems and methods for intelligent alerting, such as providing context-appropriate notifications. More particularly, the disclosed technology may relate to determining what type of alert may be required, or at what time that alert should be presented to a user, based on real-time monitoring of data (e.g., flight information), user activity status information (e.g., whether a user is sleeping), and/or user alert preferences. The systems and methods described herein may utilize, in some instances, machine learning models (MLMs), which are necessarily rooted in computers and technology. Machine learning models are a unique computer technology that involves training models to complete tasks and make decisions. The present disclosure details determining whether a user alert is required, and if so, determining what type of alert should be presented to the user. This, in some examples, may involve using location and/or time-based input data and a machine learning model (MLM), applied to determine a type and time of required user alert, to output an applicable user alert. Using an MLM in this way may allow the system to provide a custom alert to a user based on how long it may take the user to reach a particular location (e.g., flight departure gate) by a certain time. This is a clear advantage and improvement over prior technologies that merely provide a user alert indicating that some travel information has changed because these technologies fail to take into account user activity status information. Furthermore, examples of the present disclosure may also improve the speed with which computers can determine required user alert types. Overall, the systems and methods disclosed may have significant practical applications in the notification and alerting field because of the noteworthy improvements of the alert type and time determinations, which are important to solving present problems with this technology.

The systems and methods described herein may also improve, in some instances, the operation of computers and technology. The present disclosure further details real-time monitoring of changes in user activity status information to provide updates to the above-described alert types and time determinations. This, in some examples, may involve using unique algorithms to dynamically monitor whether a provided alert type at a selected time successfully alerted a customer (e.g., woke the customer from a nap) to a data update (e.g., a flight gate change), which improves the way a notification system operates. Using a computer system configured in this way may allow the system to provide dynamic user alerts depending on what a user is doing at given times (e.g., napping, resting, reading, working, etc.). This is a clear advantage and improvement over prior technologies that typically alert customers using some default frequency and type because these technologies fail to provide different or additional alert types if an initially provided alert is insufficient. The present disclosure may solve this problem by determining the sufficiency or success of a first alert, and if necessary, providing a second, different alert to notify a user more successfully. Furthermore, examples of the present disclosure may also improve the speed with which computers can provide such notifications. Overall, the systems and methods disclosed may have significant practical applications in the notification and alerting field because of the noteworthy improvements of the modification of alert type and frequency based on changes in user status, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for intelligent alerting, in accordance with certain embodiments of the disclosed technology. The steps of method 100 may be performed by one or more components of the system 300 (e.g., notification system 220 or web server 310 of monitoring system 308, user device(s) 302, or third-party server 304), as described in more detail with respect to FIGS. 2 and 3.

In block 102, the notification system 220 may receive data corresponding to a user, e.g., a customer, individual, etc. The data may include travel data, such as flight information, e.g., date, time, location, any updates, delays, cancellations, gate changes, likelihood of any changes, re-bookings, etc. The system may receive this data in a variety of ways. In some embodiments, the system may receive this data manually, such as from the user entering the data into an application, e.g., via a graphical user interface (GUI) of a user device. This application may be owned and/or operated by the same organization that owns and/or operates monitoring system 308. For example, the user may be able to enter this data in a type of user profile. In some embodiments, notification system 220 may be configured to receive this data through the user's transaction history. For example, if the user booked a flight using a Capital One® credit card, Capital One® as the owner and/or operator of notification system 220, may be able to access the data by looking through the user's transaction history. In some embodiments, notification system 220 may be configured to prompt the user for additional data when notification system 220, for example, sees the user has booked some form of travel ticket (e.g., a flight, train, bus, etc.), but cannot access or view the details surrounding this booked trip. The notification system 220 may receive the data corresponding to the user at any point prior to the user's travel departure day and/or time.

In some embodiments, the notification system 220 may also monitor the received data for any changes or modifications. For example, the notification system 220 may be configured to conduct real-time tracking of the user's data, such as flight information, such that the notification system 220 can identify when any changes occur, such as those relating to date, time, location, delays, cancellations, change in departure and/or arrival gate or other location, any likelihood of change, a re-booking, and the like. The notification system 220 may be configured to receive any such changes or modifications from, for example, a third party owned and/or operated application programming interface (API) (e.g., via third-party server 304), or an application, system, database, etc. owned and/or operated by monitoring system 308.

In block 104, the notification system 220 may optionally receive one or more alert preferences associated with the user. For example, the user may enter preferences, e.g., via an application GUI or other user profile, as discussed above, as to how and/or when the user wishes to be alerted by the system as to any updates or modifications to the user's booked travel. For example, the user may enter a first alert preference that when the system determines the user is likely sleeping, as further discussed below, the system should provide a sound alarm at a medium-level volume to the user at least 45 minutes prior to the user's scheduled departure time. As another example, the user may enter a second alert preference that when the system determines the user to require approximately fifteen minutes of walking time between a current location and a departure location, e.g., based on the user's typical walking speed and current location, the system should provide a push-notification to the user's mobile device at least 30 minutes prior to the user's scheduled departure time. As with receiving the data, as discussed in block 102, the notification system 220 may receive the alert preference(s) at any point prior to the user's travel departure day and/or time.

In block 106, the notification system 220 may receive, via one or more user devices, activity status information associated with the user. For example, while waiting for a scheduled time, such as a flight departure time, a user may spend his or her time waiting in close proximity to one or more user devices. For example, the user may sit in a lounge chair, take a nap in a sleeping pod, connect his/her work laptop into a business center, and the like. Each of these devices, e.g., the lounge chair, sleeping pod, business center, etc., may include a communications interface, such as a near-field communication (NFC) reader, as further discussed below, such that the device may act as a form of "check-in" location for the user. In some embodiments, the system (e.g., notification system 220) may receive user input indicating the user is in close proximity to one of these locations, such as via the user swiping an NFC port on, e.g., a mobile device, smart card, credit card, etc., against an NFC reader located on or near the device (e.g., on the outside panel of a sleeping pod). Once the system receives user input indicating a user has checked in, such as through a user device or transportation status server, the notification system 220 may be configured to receive activity status information of the user by the device presenting sensed user activity status information to the notification system 220, e.g., via the network 306. For example, a user's mobile phone may be configured to present user location information, e.g., sensed via a Global Positioning System (GPS) location tracking application, or an indication that the user is on a phone call. As another example, a sleeping pod may be configured to present an indication of whether the user is lying down, e.g., sensed via pressure sensor(s), or whether the user might be sleeping, e.g., sensed via breathing and/or heart rate monitors. As another example, a business center may be configured to present an indication of whether the user is working, e.g., sensed via biometric movements via accelerometer and/or gyroscopic data.

In block 108, the notification system 220 may determine whether a first user alert is required. This determination may be based on the received data (block 102), the received alert preference(s) (block 104), and/or the received user activity status information (block 106). For example, the notification system 220 may receive an indication of the user's current location and compare that location to the received data including the user's flight departure gate. Based on this comparison, the notification system 220 may determine that the user is only an approximate four minute walk from his/her departure gate, and that the user is likely currently awake based on user biometric information received from a business center connected device. At the same time, the notification system 220 may not have received any user alert preference pertaining to distances of under ten minutes with respect to the difference between the user's current location and departure gate. Given each of these considerations, the notification system 220 may determine that no first user alert is required to be presented to the user.

As an alternative example, the notification system 220 may receive an indication that the user's departure gate has recently changed, and that the user's current location is now a twenty minute walk from his/her departure gate. The notification system 220 may also receive an indication from a lounge sleeping pod that the user is likely at least lightly napping based on pressure sensor(s) data indicating the user is likely lying down, and breathing monitor data. Given each of these considerations, the notification system 220 may determine that a first user alert is required to be presented to the user.

In some embodiments, the determination of whether a first user alert is required may be based on a customizable, yet default, setting in the user's profile, as discussed above. For example, a default alert setting may be to present a specific type of alert to the user at two hours, one hour, and thirty minutes prior to the user's departure time.

In some embodiments, the determination of whether a first user alert is required may be configured as a hard-coded setting within notification system 220, for example, based on a location and/or time-based determination, as discussed above. In some embodiments, the determination may be based on an event driven method (e.g., an "if/then" or "yes/no" configuration). For example, if the distance between the user's current location and the user's departure location (e.g., an airport gate) requires more than a 15 minute walk (e.g., approximated based on average adult walking speed), then the notification system 220 may determine a first alert is required.

In some embodiments, the determination of whether a first user alert is required may be based on a predictive method, such as an MLM. As discussed in more detail below in relation to FIG. 2, the MLM may be trained, for example, based on a sample set of data (e.g., flight data), user alert preferences, user activity status information (e.g., ranges of walking speeds from various users), frequencies at which a second alert is required, or frequencies at which certain data (e.g., flight data) is changed, to learn how to determine what types of combinations of these inputs may require a first alert.

In block 110, in response to determining the first user alert is required, the notification system 220 may determine a first type of alert and a first time to present the first type of alert to the user. For example, the system may be configured to determine what type of alert may be most helpful to the user or successful in causing a response from the user. Additionally, the system may be configured to determine at what time the alert may be presented to the user such that the user has sufficient time to respond to the alert (e.g., to make a scheduled departure time). For example, the system may present an instruction to generate an alert at a given time and/or at a given device proximate, or associated with, the user. This determination of alert type and/or timing may be based on the received data (block 102), the received alert preference(s) (block 104), the received activity status information (block 106), and/or any default or customizable settings in the user's profile. The first type of alert may be, for example, a lighting change, a sound, a volume change, a notification, and the like. Presenting the first type of alert may involve, for example, providing haptic feedback, playing an alarm, sending a push-notification, and the like. For example, in the situation outlined above where the user may likely be lightly sleeping in the lounge sleeping pod, the notification system 220 may determine that a lighting change alert, e.g., turning the lights inside the sleeping pod to a brighter setting, is required to be presented to the user fifty minutes prior to his/her departure time to allow the user time to wake up, collect his/her belongings, and walk the estimated twenty minute walk to the departure gate.

In block 112, the notification system 220 may cause at least one of the one or more user devices to present the first type of alert to the user at the first time. For example, the notification system 220 may cause the sleeping pod, in the above example, to increase the brightness of its internal lighting system at the fifty minute mark prior to the user's departure time. As another example, if the user is determined to be likely awake yet sitting back in a lounge chair, notification system 220 may cause the lounge chair to provide haptic feedback (e.g., a light vibration) to the user fifteen minutes prior to the user's departure time such that the user may get up, collect his/her belongings, and walk an estimated three minutes to his/her departure gate.

In block 114, the notification system 220 may receive, via the at least one of the user devices, updated activity status information associated with the user. For example, in the situation described above wherein a user is napping in the sleeping pod, and the sleeping pod has already turned up its internal lights at the fifty minute mark prior to the user's departure time, the notification system 220 may receive updated activity status information from the sleeping pod indicating the user is likely still asleep (again via, e.g., pressure sensor(s), or other monitor data).

In block 116, the notification system 220 may determine whether the updated activity status information exceeds a predetermined threshold. For example, notification system 220 may be configured to determine whether the first user alert was successful at changing the user's current status (e.g., if it woke the user from a nap) through the use of a monitoring algorithm. This algorithm may be based on one or more basic logic functions, binary classification models, or higher-level trained technologies (e.g., an MLM). In some embodiments, each type of user status sensing component (e.g., a lounge chair pressure sensor, sleeping pod breathing rate monitor, business center biometric voice recognition device, etc.) may be associated with a respective predefined threshold. In some embodiments, these predefined thresholds may be configured such that any change in user status in response to the first user alert (e.g., a change in breathing rate) indicates the respective predefined threshold was exceeded (e.g., an "if/then" or "yes/no" configuration). In other embodiments, each respective predefined threshold may be set depending on the type of device. For example, a predefined threshold of a breathing rate monitor may be defined based on average breathing rates of humans during certain activities (e.g., sleeping, resting, etc.) and/or based on one or more variables (e.g., age, sex, weight, etc.). In such embodiments where a higher-level trained technology is used, such an MLM, the model may be trained using data sets based on these averages and variables, such that the model learns to compare and adjust a specific user's own tendencies, e.g., breathing rate, heart rate, etc., when that user conducts certain activities in order to determine whether that user's predefined threshold(s) has been exceeded.

In response to determining the updated activity status information exceeds the predetermined threshold, and hence, the first alert was likely successful, the notification system 220 may determine a second type of alert is not required. Alternatively, in some embodiments, in response to determining the updated activity status information exceeds the predetermined threshold, the notification system 220 may still determine another alert is required. For example, the notification system 220 may receive updated data corresponding to the user, such as a departure time or gate change. Notification system 220 may receive the updated data in the same or similar fashion as it receives the data in block 102. Based on the updated data, the notification system 220 may determine a second alert is required, for example, to ensure the user has enough time to get to a changed departure location, or the same departure location but by a changed departure time.

In block 118, in response to determining the updated activity status information does not exceed the predetermined threshold, and hence, a second alert is likely required, the notification system 220 may determine a second type of alert and a second time to present the second type of alert to the user. This determination may be similar to that described in block 110 with respect to the first type of alert and the first time to present the first type of alert. However, determining the second type of alert and second time may be further based on the received updated activity status information associated with the user, as described above in block 114. For example, if the first alert, presented to the user fifty minutes prior to his/her departure time, was a lighting change alert to turn the lights inside a sleeping pod to a brighter setting to wake the user from a nap, and the updated activity status information indicates the user may likely still be sleeping, the notification system 220 may determine a different type of second alert to be presented to the user at a second time. For example, the second type of alert may be a high volume sound alarm and/or haptic feedback (e.g., vibration) to be presented through the sleeping pod at a second time of now thirty minutes prior to the user's departure time. In some embodiments where the notification system 220 has received updated data corresponding to the user (e.g., a changed departure time), as discussed above, the updated data may also be used in the determination of the second type of alert and the second time for presenting the second type of alert to the user.

In block 120, the notification system 220 may cause the at least one of the user device(s) to present the second type of alert to the user at the second time. For example, as in the above example, the notification system 220 may cause the sleeping pod to present the high volume sound alarm and/or haptic feedback to the user thirty minutes prior to the user's departure time.

Figure 2:
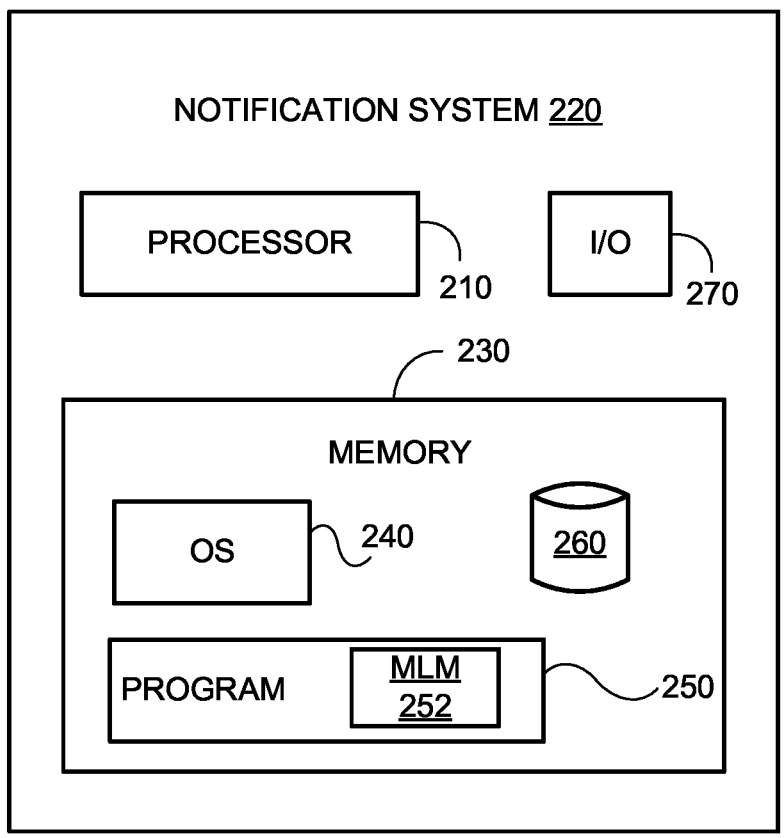
FIG. 2 is block diagram of an example notification system used to provide intelligent alerting, according to an example implementation of the disclosed technology.
Figure 3:
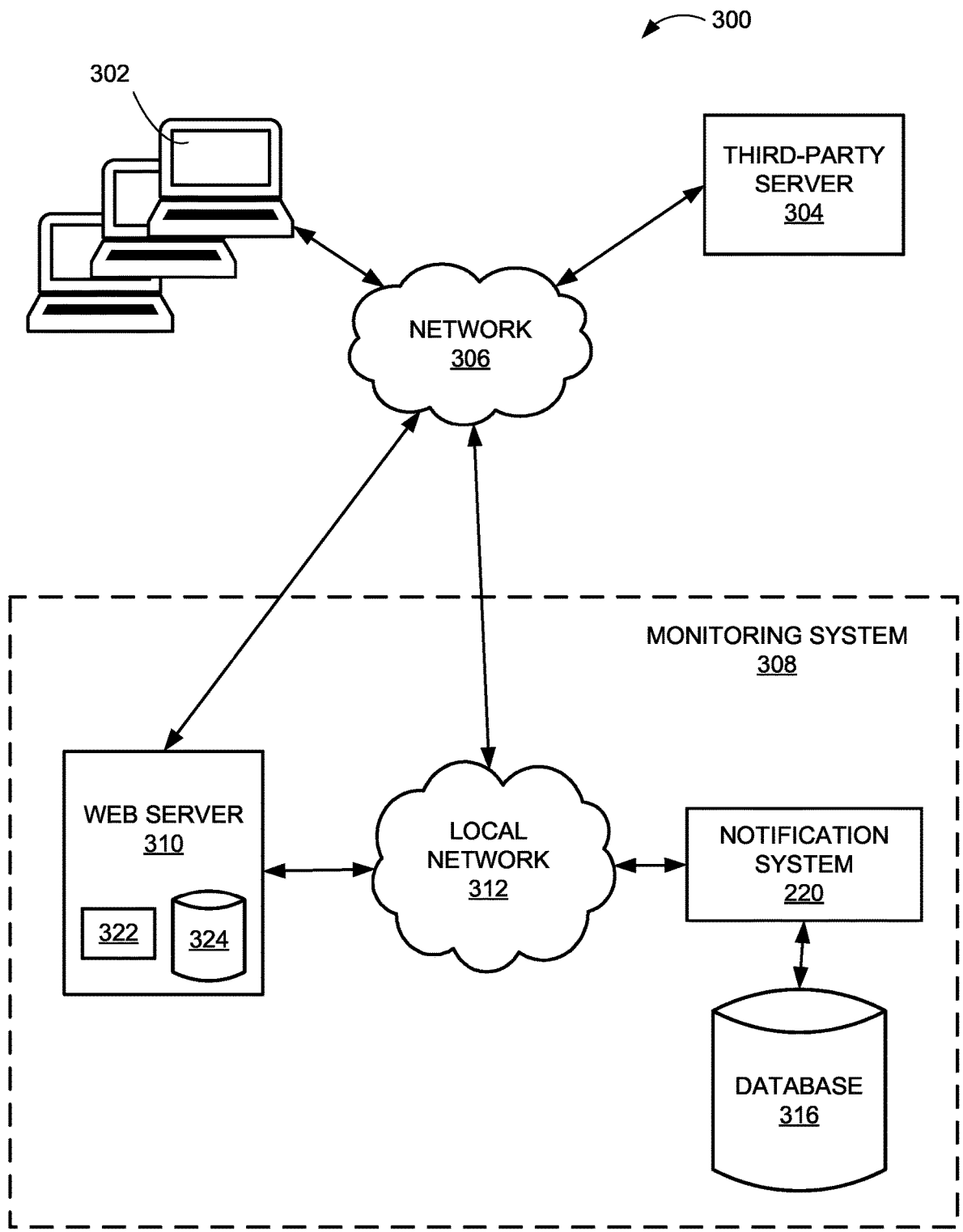
FIG. 3 is block diagram of an example system that may be used to provide intelligent alerting, according to an example implementation of the disclosed technology.

FIG. 2 is a block diagram of an example notification system 220 used to determine whether a user alert is required, and if so, what type of alert should be provided to a user, and at what time, according to an example implementation of the disclosed technology. According to some embodiments, the user device(s) 302, third-party server 304, and web server 310, as depicted in FIG. 3 and described below, may have a similar structure and components that are similar to those described with respect to notification system 220 shown in FIG. 2. As shown, the notification system 220 may include processor(s) 210, an input/output (I/O) device 270, a memory 230 containing an operating system (OS) 240 and a program 250. In some embodiments, program 250 may include an MLM 252 that may be trained, for example, to determine what type of alert should be provided to a user and at what time. In certain implementations, MLM 252 may issue commands in response to processing an event, in accordance with a model that may be continuously or intermittently updated. Moreover, processor 210 may execute one or more programs (such as via a rules-based platform or the trained MLM 252), that, when executed, perform functions related to disclosed embodiments.

In certain example implementations, the notification system 220 may be a single server or may be configured as a distributed computer system including multiple servers or computers that interoperate to perform one or more of the processes and functionalities associated with the disclosed embodiments. In some embodiments notification system 220 may be one or more servers from a serverless or scaling server system. In some embodiments, the notification system 220 may further include a peripheral interface, a transceiver, a mobile network interface in communication with the processor 210, a bus configured to facilitate communication between the various components of the notification system 220, and a power source configured to power one or more components of the notification system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the notification system 220 may include one or more storage devices configured to store information used by the processor 210 (or other components) to perform certain functions related to the disclosed embodiments. In one example, the notification system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The notification system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the notification system 220 may include the memory 230 that may include one or more programs 250 to perform one or more functions of the disclosed embodiments. For example, in some embodiments, the notification system 220 may additionally manage dialogue and/or other interactions with the customer via a program 250.

The processor 210 may execute one or more programs 250 located remotely from the notification system 220. For example, the notification system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a notification system database 260 for storing related data to enable the notification system 220 to perform one or more of the processes and functionalities associated with the disclosed embodiments.

The notification system database 260 may include stored data relating to status data (e.g., average session duration data, location data, idle time between sessions, and/or average idle time between sessions) and historical status data. According to some embodiments, the functions provided by the notification system database 260 may also be provided by a database that is external to the notification system 220, such as the database 316 as shown in FIG. 3.

The notification system 220 may also be communicatively connected to one or more memory devices (e.g., databases) locally or through a network. The remote memory devices may be configured to store information and may be accessed and/or managed by the notification system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The notification system 220 may also include one or more I/O devices 270 that may comprise one or more interfaces for receiving signals or input from devices and providing signals or output to one or more devices that allow data to be received and/or presented by the notification system 220. For example, the notification system 220 may include interface components, which may provide interfaces to one or more input devices, such as one or more keyboards, mouse devices, touch screens, track pads, trackballs, scroll wheels, digital cameras, microphones, sensors, and the like, that enable the notification system 220 to receive data from a user (such as, for example, via the user device(s) 302).

In examples of the disclosed technology, the notification system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The notification system 220 may contain programs that train, implement, store, receive, retrieve, and/or present one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another MLM. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The notification system 220 may be configured to adjust model parameters during training. Model parameters may include weights, coefficients, offsets, or the like. Training may be supervised or unsupervised.

The notification system 220 may be configured to train MLMs by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The notification system 220 may be configured to optimize statistical models using known optimization techniques.

Furthermore, the notification system 220 may include programs configured to retrieve, store, and/or analyze properties of data models and datasets. For example, notification system 220 may include or be configured to implement one or more data-profiling models. A data-profiling model may include MLMs and statistical models to determine the data schema and/or a statistical profile of a dataset (e.g., to profile a dataset), consistent with disclosed embodiments. A data-profiling model may include an RNN model, a CNN model, or other MLM.

The notification system 220 may include algorithms to determine a data type, key-value pairs, row-column data structure, statistical distributions of information such as keys or values, or other property of a data schema may be configured to return a statistical profile of a dataset (e.g., using a data-profiling model). The notification system 220 may be configured to implement univariate and multivariate statistical methods. The notification system 220 may include a regression model, a Bayesian model, a statistical model, a linear discriminant analysis model, or other classification model configured to determine one or more descriptive metrics of a dataset. For example, notification system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The notification system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, notification system 220 may be configured to generate a similarity metric representing a measure of similarity between data in a dataset. A similarity metric may be based on a correlation, covariance matrix, a variance, a frequency of overlapping values, or other measure of statistical similarity.

The notification system 220 may be configured to generate a similarity metric based on data model output, including data model output representing a property of the data model. For example, notification system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The notification system 220 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The notification system 220 may include one or more data classification models to classify datasets based on the data schema, statistical profile, and/or edges. A data classification model may include a convolutional neural network, a random forest model, a recurrent neural network model, a support vector machine model, or another MLM. A data classification model may be configured to classify data elements as actual data, synthetic data, related data, or any other data category. In some embodiments, notification system 220 is configured to generate and/or train a classification model to classify a dataset, consistent with disclosed embodiments.

The notification system 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the notification system may analyze information applying machine-learning methods.

While the notification system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the notification system 220 may include a greater or lesser number of components than those illustrated.

FIG. 3 is a block diagram of an example system that may be used to view and interact with monitoring system 308, according to an example implementation of the disclosed technology. The components and arrangements shown in FIG. 3 are not intended to limit the disclosed embodiments as the components used to implement the disclosed processes and features may vary. As shown, monitoring system 308 may interact with one or more user devices 302 and a third-party server 304 via a network 306. In certain example implementations, the monitoring system 308 may include a local network 312, a notification system 220, a web server 310, and a database 316.

In some embodiments, a user may operate the user device(s) 302. The user device(s) 302 can include one or more of a mobile device, smart phone, general purpose computer, tablet computer, laptop computer, telephone, public switched telephone network (PSTN) landline, smart wearable device, voice command device, other mobile computing device, a smart furniture device (e.g., a sleeping pod, lounge chair, etc.), or any other device capable of communicating with the network 306 and ultimately communicating with one or more components of the monitoring system 308. In some embodiments, the user device(s) 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the monitoring system 308. According to some embodiments, the user device(s) 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as RFID, NFC, Bluetooth™ BLE, WiFi™, ZigBee™, ABC protocols, USB, WAN, or LAN. Because the information presented may be personal or confidential, security concerns may dictate one or more of these types of connections be encrypted or otherwise secured. In some embodiments, however, the information being presented may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The monitoring system 308 may be associated with and optionally controlled by one or more entities such as a business, corporation, individual, partnership, or any other entity that provides one or more of goods, services, and consultations to individuals such as customers. In some embodiments, the monitoring system 308 may be controlled by a third party on behalf of another business, corporation, individual, and/or partnership. The monitoring system 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device(s) 302 via for example, a mobile application, a chat program, an instant messaging program, a voice-to-text program, an SMS message, email, a biometric sensor, a pressure sensor, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device(s) 302. For example, web server 310 may host a financial service provider website that a user device may access by providing an attempted login that are authenticated by the notification system 220. According to some embodiments, web server 310 may include software tools, similar to those described with respect to user device(s) 302 above, that may allow web server 310 to obtain network identification data from user device(s) 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the monitoring system 308 to interact with one another and to connect to the network 306 for interacting with components in the system 300 environment. In some embodiments, the local network 312 may include an interface for communicating with or linking to the network 306. In other embodiments, certain components of the monitoring system 308 may communicate via the network 306, without a separate local network 306.

The monitoring system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device(s) 302 may be able to access monitoring system 308 using the cloud computing environment. User device(s) 302 may be able to access monitoring system 308 using specialized software. The cloud computing environment may eliminate the need to install specialized software on user device(s) 302.

In accordance with certain example implementations of the disclosed technology, the monitoring system 308 may include one or more computer systems configured to compile data from a plurality of sources, including the user device(s) 302, third-party server 304, notification system 220, web server 310, and/or the database 316. The notification system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, a user may book a flight for an upcoming trip through an airline website (e.g., American Airlines®). When the user arrives at the airport on the day of travel, the user may opt to wait for her departure time in a waiting lounge, such as one owned and/or operated by an external organization (e.g., Capital One®). Capital One® may own and/or operate a monitoring system configured to receive the user's travel information, and any updates or changes made thereto. The monitoring system may receive the user's travel information through the user's transaction data (e.g., if the user used a Capital One® credit card to book the flight initially) and/or via a third-party API (e.g., of American Airlines®).

Meanwhile, the user may enter the lounge and check into a check-in location using her Capital One® credit card. A check-in location may be, for example, a terminal at the front entrance to the lounge, a sleeping pod, a lounge chair, a workstation, etc. To check in at a location, the user may swipe her credit card against a communication signal reader, such as an NFC reader, located proximate the location, such as on an outside panel of the sleeping pod. Once the user has checked into the sleeping pod, the monitoring system may begin receiving user activity status information via the user's mobile device and/or the sleeping pod itself. For example, the sleeping pod may be configured with pressure sensors, e.g., on the door or under the seat/cot, that can help to determine whether the user is still in the pod, and whether the user is sitting up or laying down. As another example, the sleeping pod may be configured with certain monitors, such as a heart rate monitor and/or a breathing monitor. The monitoring system may receive user activity status information (e.g., based on outputs from the pressure sensors and monitors) from the sleeping pod via a network.

Using both the user's travel information and the user activity status information, the monitoring system may be configured to determine whether a user alert is required. For example, if the current time is 2:00 PM, the user's flight leaves at 4:00 PM, and the user is likely currently asleep, the monitoring system may determine that a first user alert of slowly turning on the lights inside the sleeping pod should occur at 3:15 PM. The time may be selected based on the location of the waiting lounge relative to the location of the user's departure gate in the airport, and approximately how long it may take the user to walk from the lounge to the gate. Once the monitoring system determines the type and time of the user alert, the monitoring system may present a signal to the sleeping pod, via the network, to cause the sleeping pod to begin slowly turning on the lights at 3:15 PM.

The monitoring system may then receive updated user activity status information from the sleeping pod. For example, the monitoring system may receive notification that the outputs from the pressure sensors and monitors have not changed significantly to deem the first alert "successful." As such, the monitoring system may determine a second user alert is required, for example, turning the lights in the sleeping pod fully on and turning on a bell chime audible sound at 3:30 PM. The monitoring system may present a signal to cause the sleeping pod to provide such alarm at 3:30 PM. At this point, the user may wake up, collect her belongings, and walk to her gate to make her 4:00 PM flight departure time.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive data corresponding to a user; receive, via one or more user devices, activity status information associated with the user; determine that a first user alert is required based on the data and the activity status information; responsive to determining the first user alert is required: determine a first type of alert and a first time to present the first type of alert to the user; and cause at least one of the one or more user devices to present the first type of alert to the user at the first time; receive, via the at least one of the one or more user devices, updated activity status information associated with the user; determine whether the updated activity status information exceeds a predetermined threshold; and responsive to determining the updated activity status information does not exceed the predetermined threshold: determine a second type of alert and a second time to present the second type of alert to the user; and cause the at least one of the one or more user devices to present the second type of alert to the user at the second time.

Clause 2: The system of clause 1, wherein the instructions are further configured to cause the system to: responsive to determining the updated activity status information exceeds the predetermined threshold, determine that the second type of alert is not required.

Clause 3: The system of clause 1, wherein the data comprises travel data comprising one or more of a date, a time, a location, updates, delays, cancellations, a gate change, a likelihood of a change, a rebooking, or combinations thereof.

Clause 4: The system of clause 1, wherein the instructions are further configured to cause the system to: receive updated data corresponding to the user, wherein determining the second type of alert and the second time to present the second type of alert to the user are further responsive to receiving the updated data.

Clause 5: The system of clause 1, wherein the one or more user devices comprise one or more of a mobile phone, a wearable device, a check-in terminal, lounge furniture, a sleeping pod, or combinations thereof.

Clause 6: The system of clause 1, wherein the activity status information comprises one or more of breathing rate, heart rate, biometric data, location data, or combinations thereof.

Clause 7: The system of clause 1, wherein the first and second types of alert comprise one or more of a lighting change, a sound, a volume change, haptic feedback, an alarm, a push-notification, or combinations thereof.

Clause 8: A system comprising: one or more processors; and a memory in communication with the one or more processors and storing instructions that, when executed by the one or more processors, are configured to cause the system to: receive flight data corresponding to a user; receive one or more alert preferences associated with the user; receive, via one or more user devices, activity status information associated with the user; determine a first type of alert and a first time to present the first type of alert to the user based on the flight data, the one or more alert preferences, and the activity status information; and cause at least one of the one or more user devices to present the first type of alert to the user at the first time.

Clause 9: The system of clause 8, wherein the instructions are further configured to cause the system to: receive, via the at least one of the one or more user devices, updated activity status information associated with the user; receive updated flight data corresponding to the user; determine whether the updated activity status information exceeds a predetermined threshold; responsive to determining the updated activity status information does not exceed the predetermined threshold: determine, based on the updated flight data, a second type of alert and a second time to present the second type of alert to the user; and cause the at least one of the one or more user devices to present the second type of alert to the user at the second time; and responsive to determining the updated activity status information exceeds the predetermined threshold: determine, based on the updated flight data, a third type of alert and a third time to present the third type of alert to the user; and cause the at least one of the one or more user devices to present the third type of alert to the user at the third time.

Clause 10: The system of clause 9, wherein: the one or more user devices comprise one or more of a mobile phone, a wearable device, a check-in terminal, lounge furniture, a sleeping pod, or combinations thereof; and the activity status information comprises one or more of breathing rate, heart rate, biometric data, location data, or combinations thereof.

Clause 11: The system of clause 9, wherein the first, second, and third types of alert comprise one or more of a lighting change, a sound, a volume change, haptic feedback, an alarm, a push-notification, or combinations thereof.

Clause 12: A system comprising: one or more processors; and a memory in communication with the one or more processors and storing instructions that, when executed by the one or more processors, are configured to cause the system to: receive data corresponding to a user; receive, via one or more user devices, activity status information associated with the user; determine whether a first user alert is required based on the data and the activity status information; and responsive to determining the first user alert is required: determine a first type of alert and a first time to present the first type of alert to the user; and cause at least one of the one or more user devices to present the first type of alert to the user at the first time.

Clause 13: The system of clause 12, wherein the instructions are further configured to cause the system to: receive, via the at least one of the one or more user devices, updated activity status information associated with the user; determine whether the updated activity status information exceeds a predetermined threshold; responsive to determining the updated activity status information exceeds the predetermined threshold, determine that a second type of alert is not required; and responsive to determining the updated activity status information does not exceed the predetermined threshold: determine the second type of alert and a second time to present the second type of alert to the user; and cause the at least one of the one or more user devices to present the second type of alert to the user at the second time.

Clause 14: The system of clause 13, wherein determining whether the updated activity status information exceeds a predetermined threshold is performed by a machine learning model.

Clause 15: The system of clause 13, wherein the first and second types of alert comprise one or more of a lighting change, a sound, a volume change, haptic feedback, an alarm, a push-notification, or combinations thereof.

Clause 16: The system of clause 12, wherein the data comprises flight information.

Clause 17: The system of clause 16, wherein the flight information comprises one or more of a date, a time, a location, updates, delays, cancellations, a gate change, a likelihood of a change, a rebooking, or combinations thereof.

Clause 18: The system of clause 12, wherein receiving the data corresponding to the user comprises monitoring the data for any changes.

Clause 19: The system of clause 12, wherein the one or more user devices comprise one or more of a mobile phone, a wearable device, a check-in terminal, lounge furniture, a sleeping pod, or combinations thereof.

Clause 20: The system of clause 12, wherein the activity status information comprises one or more of breathing rate, heart rate, biometric data, location data, or combinations thereof.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
a memory in communication with the one or more processors and storing instructions that, when executed by the one or more processors, are configured to cause the system to:
receive data corresponding to a user, the data comprising first location information;
receive an indication that the user is in close proximity to at least a first user device of one or more user devices, the first user device comprising a stationary device;
responsive to receiving the indication:
determine a current location of the user; and
receive, via the first user device, activity status information associated with the user, wherein the activity status information comprises one or more of breathing rate, heart rate, biometric data, or combinations thereof;
compare the current location of the user to the first location information;
determine that a first user alert is required based on the data, the comparison, and the activity status information;
responsive to determining the first user alert is required:
determine a first type of alert and a first time to present the first type of alert to the user; and
cause at least one of the one or more user devices to present the first type of alert to the user at the first time;
receive, via the first user device, updated activity status information associated with the user;
determine whether the updated activity status information exceeds a predetermined threshold; and
responsive to determining the updated activity status information does not exceed the predetermined threshold:
determine a second type of alert and a second time to present the second type of alert to the user; and
cause the at least one of the one or more user devices to present the second type of alert to the user at the second time,
wherein the first and second types of alerts comprise haptic feedback.

2. The system of claim 1, wherein the instructions are further configured to cause the system to:
responsive to determining the updated activity status information exceeds the predetermined threshold, determine that the second type of alert is not required.

3. The system of claim 1, wherein the data comprises travel data comprising one or more of a date, a time, a location, updates, delays, cancellations, a gate change, a likelihood of a change, a rebooking, or combinations thereof.

4. The system of claim 1, wherein the instructions are further configured to cause the system to:
receive updated data corresponding to the user, wherein determining the second type of alert and the second time to present the second type of alert to the user are further responsive to receiving the updated data.

5. The system of claim 1, wherein the first user device comprises one or more of a check-in terminal, lounge furniture, a sleeping pod, a business center, or combinations thereof.

6. The system of claim 1, wherein the first and second types of alert further comprise one or more of a lighting change, a sound, a volume change, an alarm, a push-notification, or combinations thereof.

7. The system of claim 1, wherein the first user device comprises a first device type, and wherein the predetermined threshold is based on the first device type.

8. The system of claim 1, wherein the predetermined threshold is based on one or more characteristics of the user, the one or more characteristics comprising one or more of age, sex, or combinations thereof.

9. A system comprising:
one or more processors; and
a memory in communication with the one or more processors and storing instructions that, when executed by the one or more processors, are configured to cause the system to:
receive flight data corresponding to a user, the flight data comprising first location information;
receive one or more alert preferences associated with the user;
receive an indication that the user is in close proximity to at least a first user device of one or more user devices, the first user device comprising a stationary device;
responsive to receiving the indication:
determine a current location of the user; and
receive, via the first user device, activity status information associated with the user, wherein the activity status information comprises one or more of breathing rate, heart rate, biometric data, or combinations thereof;
compare the current location of the user to the first location information;
determine a first type of alert and a first time to present the first type of alert to the user based on the flight data, the one or more alert preferences, the comparison, and the activity status information; and
cause at least one of the one or more user devices to present the first type of alert to the user at the first time,
wherein the first type of alert comprises haptic feedback.

10. The system of claim 9, wherein the instructions are further configured to cause the system to:
receive, via the first user device, updated activity status information associated with the user;
receive updated flight data corresponding to the user;
determine whether the updated activity status information exceeds a predetermined threshold;
responsive to determining the updated activity status information does not exceed the predetermined threshold:
determine, based on the updated flight data, a second type of alert and a second time to present the second type of alert to the user; and
cause the at least one of the one or more user devices to present the second type of alert to the user at the second time; and
responsive to determining the updated activity status information exceeds the predetermined threshold:

determine, based on the updated flight data, a third type of alert and a third time to present the third type of alert to the user; and
cause the at least one of the one or more user devices to present the third type of alert to the user at the third time.

11. The system of claim 10, wherein:
the one or more user devices comprise one or more of a mobile phone, a wearable device, a check-in terminal, lounge furniture, a sleeping pod, or combinations thereof.

12. The system of claim 10, wherein the first, second, and third types of alert comprise one or more of a lighting change, a sound, a volume change, an alarm, a push-notification, or combinations thereof.

13. A system comprising:
one or more processors; and
a memory in communication with the one or more processors and storing instructions that, when executed by the one or more processors, are configured to cause the system to:
receive data corresponding to a user, the data comprising first location information;
receive user input indicating the user being in close proximity to at least a first user device of one or more user devices, the first user device comprising a stationary device;
responsive to receiving the user input;
determine a current location of the user; and
receive, via the first user device, activity status information associated with the user, wherein the activity status information comprises one or more of breathing rate, heart rate, biometric data, or combinations thereof;
compare the current location of the user to the first location information;
determine whether a first user alert is required based on the data, the comparison, and the activity status information; and
responsive to determining the first user alert is required:
determine a first type of alert and a first time to present the first type of alert to the user; and
cause at least one of the one or more user devices to present the first type of alert to the user at the first time,
wherein the first type of alert comprises haptic feedback.

14. The system of claim 13, wherein the instructions are further configured to cause the system to:
receive, via the first user device, updated activity status information associated with the user;
determine whether the updated activity status information exceeds a predetermined threshold;
responsive to determining the updated activity status information exceeds the predetermined threshold, determine that a second type of alert is not required; and
responsive to determining the updated activity status information does not exceed the predetermined threshold:
determine the second type of alert and a second time to present the second type of alert to the user; and
cause the at least one of the one or more user devices to present the second type of alert to the user at the second time.

15. The system of claim 14, wherein determining whether the updated activity status information exceeds a predetermined threshold is performed by a machine learning model.

16. The system of claim 13, wherein the data comprises flight information.

17. The system of claim 16, wherein the flight information comprises one or more of a date, a time, a location, updates, delays, cancellations, a gate change, a likelihood of a change, a rebooking, or combinations thereof.

18. The system of claim 13, wherein receiving the data corresponding to the user comprises monitoring the data for any changes.

* * * * *